(12) United States Patent
Chen

(10) Patent No.: US 8,002,448 B2
(45) Date of Patent: Aug. 23, 2011

(54) TABLE LAMP

(75) Inventor: Cheng-Tang Chen, Sansia Township, Taipei County (TW)

(73) Assignee: Eiso Enterprise Co., Ltd., Taoyuan County (TW)

( * ) Notice: Subject to any disclaimer, the term of this patent is extended or adjusted under 35 U.S.C. 154(b) by 416 days.

(21) Appl. No.: 12/389,383

(22) Filed: Feb. 20, 2009

(65) Prior Publication Data
US 2010/0214778 A1 Aug. 26, 2010

(51) Int. Cl.
*F21S 8/08* (2006.01)

(52) U.S. Cl. ............... 362/410; 362/216; 362/217.04; 362/217.05; 362/218; 362/311.02; 362/555; 362/249.02

(58) Field of Classification Search .......... 362/216, 362/217.01–217.02, 217.04–217.05, 218, 362/223, 294, 296.01, 311.01–311.02, 326, 362/334–335, 341, 347, 395, 410, 249.02, 362/555

See application file for complete search history.

(56) References Cited

U.S. PATENT DOCUMENTS 7,441,930 B2 * 10/2008 Lin ............................ 362/410
7,682,036 B2 * 3/2010 Reiff et al. ................. 362/184

* cited by examiner

*Primary Examiner* — Stephen F Husar
*Assistant Examiner* — Meghan Dunwiddie
(74) *Attorney, Agent, or Firm* — Leong C. Lei

(57) ABSTRACT

The table lamp contains a lamp base and an extension tube plugged vertically into the lamp base. A curved transparent light tube is attached along its entire length to a parallel and also curved back cover. The combination is joined to a top end of the extension tube. Two light generation assemblies are provided at the two ends of the light tube, respectively, each sequentially composed of a lens, a lens ring, a light emitting diode, a power circuit, a heat dissipation plate, and a heat dissipation element. The light from the light emitting diodes is projected into the light tube and, with a reflection layer along the inner wall of the light tube, the light is uniformly reflected towards the area beneath the table lamp.

11 Claims, 4 Drawing Sheets

TABLE LAMP

TECHNICAL FIELD OF THE INVENTION

The present invention generally relates to table lamps, and more particularly to a table lamp using light emitting diodes to project light into a curved transparent tube from the tube's both ends to produce uniform lighting.

DESCRIPTION OF THE PRIOR ART

Incandescent light bulb is the earliest invented electrical light source and therefore conventionally various light illumination devices, including the table lamps, are designed around the incandescent light bulbs.

Due to the recent awareness of the global warming and the depletion of fossil fuel, various electrical appliances are driven to be more energy-saving and environment-friendly and light illumination devices are of no exception. Currently, light emitting diodes are the most promising candidate in replacing the inefficient incandescent light bulbs. By increasing the voltage applied, the uniformity of produced light, and the heat dissipation performance, the brightness of light emitting diodes could be enhanced for environmental illumination. Therefore, in the very near future, pretty much all light illumination devices are to be adapted to use light emitting diodes as light source. In household or office environment, one of the most common light illumination devices is the table lamp. The tale lamp, due to its small dimension, is rather difficult to be adapted to incorporate light emitting diodes.

There are already teachings where light emitting diodes and the circuit driving them are together sealed in a transparent plastic material having a screw plug just like a conventional light bulb so that it could be directly plugged into a conventional table lamp. However, as the light emitting diodes and the driving circuit are permanently sealed in the transparent plastic material, they cannot be disassembled and repaired and, if there is some malfunction, they have to be thrown away altogether and cannot be recycled, still adding burden to the environment.

SUMMARY OF THE INVENTION

Therefore, a novel table lamp is provided herein which contains a lamp base and an extension tube plugged vertically into the lamp base. A curved transparent light tube is attached along its entire length to a parallel and also curved back cover. The combination of the light tube and the tubular segment are joined to a top end of the extension tube. Two light generation assemblies are provided at the two ends of the light tube, respectively, each sequentially composed of a lens, a lens ring, a light emitting diode, a power circuit, a heat dissipation plate, and a heat dissipation element. Each lens has a light emitting end attached to an end of the light tube, and a light incident end joined to the respective lens ring so as to be further joined to the respective light emitting diode so that light from the light emitting diodes is projected into the light tube. With a reflection layer along the inner wall of the light tube, the light is uniformly reflected towards the area beneath the table lamp. The use of light emitting diodes provides a significant energy saving, which is a primary objective of the present invention.

Further more, unlike the conventional lamp's having the light emitting diodes and the power circuits packaged in some transparent plastic material, the light generation assemblies could be easily disassembled for recycled if the table lamp has to be discarded, which is another objective of the present invention.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
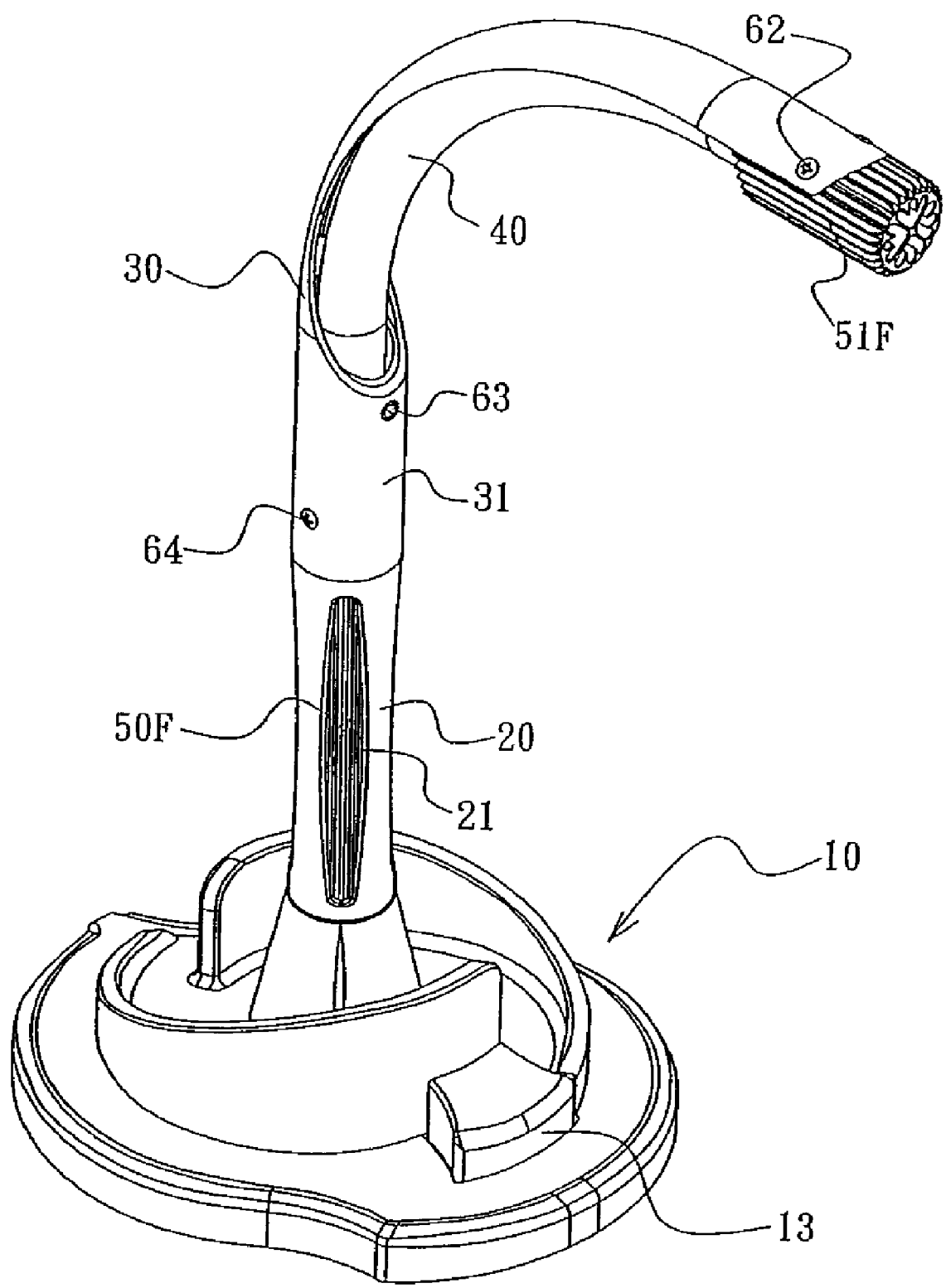
FIG. 1 is a perspective diagram showing a table lamp according to an embodiment of the present invention.
Figure 2:
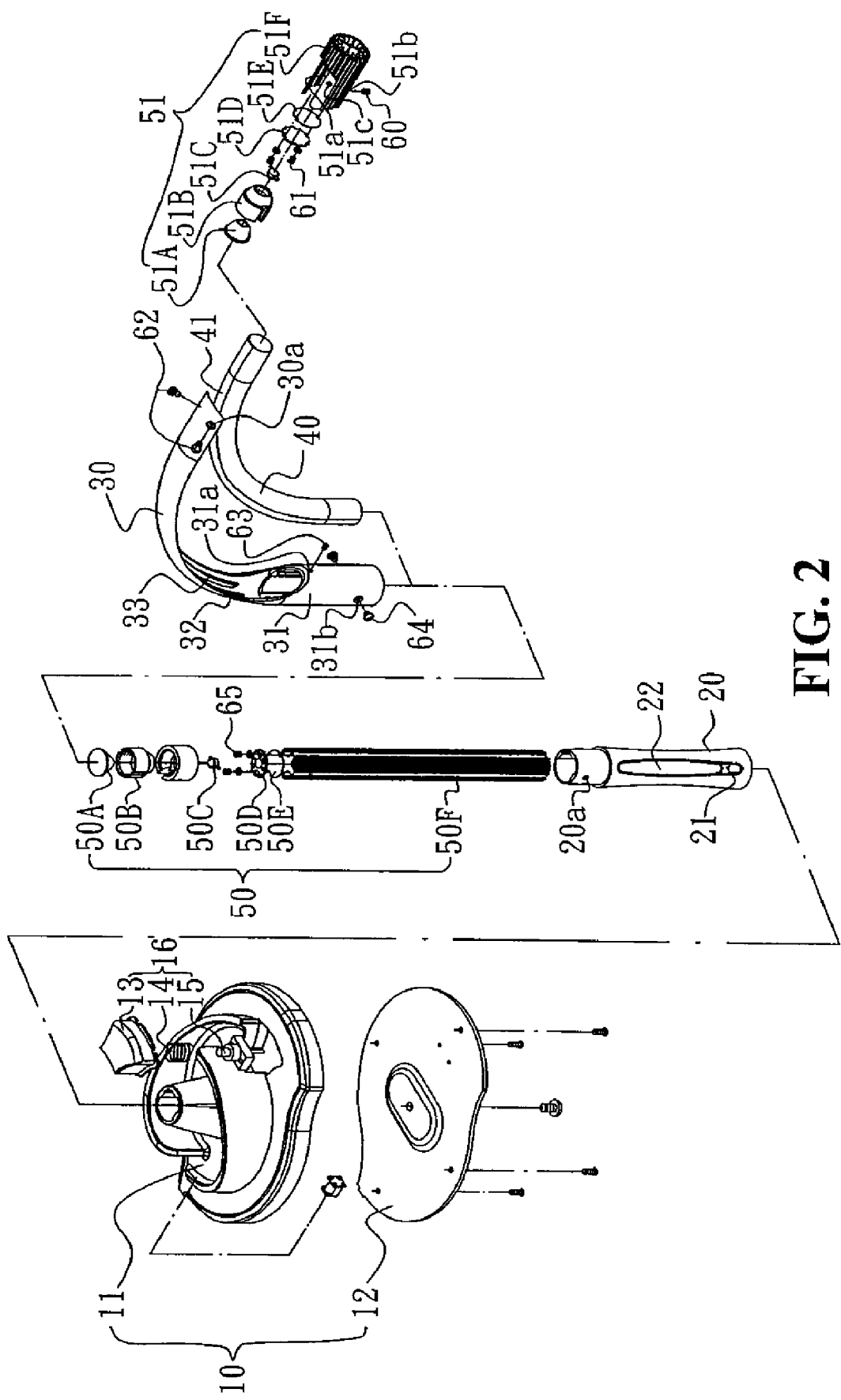
FIG. 2 is a perspective breakdown diagram showing the various components of the table lamp of FIG. 1.
Figure 3:
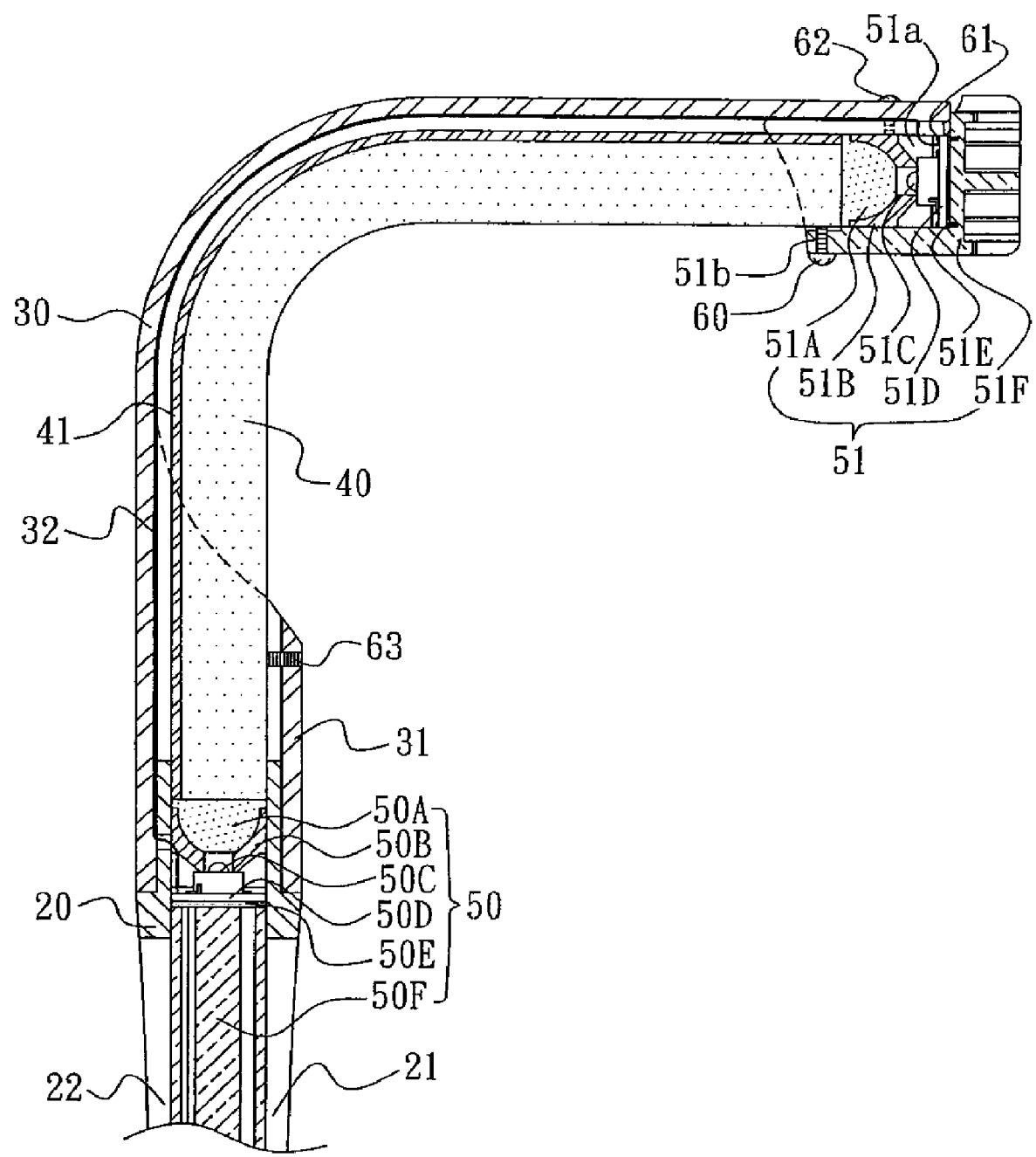
FIG. 3 is a sectional diagram showing the table lamp of FIG. 1.

As illustrated in FIGS. 1 to 3, a table lamp according to an embodiment of the present invention mainly contains a lamp base 10 and an extension tube 20 plugged vertically into a top side of the lamp base 10. A curved transparent light tube 40 is attached along its entire length to a parallel and also curved back cover 30. In the present embodiment, both the light tube 40 and the back cover 30 have an L-like shape. The back cover 30 has a tubular segment 31 at a back end and the light tube 40 is first plugged into the tubular segment 31 and the combination of the light tube 40 and the tubular segment 31 are joined to a top end of the extension tube 20. Two light generation assemblies 50 and 51 are provided at the two ends of the light tube 40, respectively, by bolts 60, 61, 62, 63, 64, and 65. The light generation assemblies 50 and 51 are sequentially composed of lenses 50A and 51A, lens rings 50B and 51B, light emitting diodes 50C and 51C, power circuits 50D and 51D, heat dissipation plates 50E and 51E, heat dissipation elements 50F and 51F, respectively. Each of the lenses 50A and 51A has a light emitting end attached to an end of the light tube 40, and a light incident end joined to the respective lens ring 50B or 51B so as to be further joined to the respective light emitting diode 50C or 51C. Please note that a portion of the inner wall of the light tube 40 that is adjacent to the back cover 30 is coated with a reflective material to form a reflection layer 41.

More specifically, even though the light generation assemblies 50 and 51 are substantially structured identically, the heat dissipation element 50F that goes into the tubular segment 31 is much longer than the heat dissipation element 51F at the other end of the light tube 40, so that the table lamp wouldn't tip over. Please also note that the heat dissipation element 51F has a tubular body with a top portion removed to form an opening 51a. The combination of the lens 51A, lens ring 51B, light emitting diode 51C, power circuit 51D, and heat dissipation plate 51E are housed in the tubular body of the heat dissipation element 51F. The light tube 40 and the back cover 30 have their front ends joined to the heat dissipation element 51F together. The bolt hole 51b is provided on the heat dissipation element 51F so that a bolt could be run through to fix the light tube 40. The opening 51a is covered by the front end of the back cover 30 and there are bolt holes 30a and 51c on the back cover 30 and the heat dissipation element 51F, respectively, so that a bolt 62 could be run through to fix the back cover 30. The power circuits 50D, 51D are attached to the heat dissipation plates 50E, 51E, and then together to the heat dissipation elements 50F and 51F, respectively. Bolts 61 and 65 are then applied to run through the power circuits 50D, 51D, the heat dissipation plates 50E, 51E, and into the heat dissipation elements 50F and 51F.

The tubular segment 31 also has a bolt hole 31a so that a bolt 63 could be run through to fix the back end of the light tube 40. To reliably join the back cover 30 and the extension tube 20, bolt holes 31b and 20a are provided thereon, respectively, so that a bolt 64 could run through. Along the wall of the extension tube 20, ventilation holes 21 and 22 are provided so that, when the table lamp is turned on and the hot heat dissipation element 50F causes convection to happen, cool air outside the table lamp is drawn into the extension tube 20 through the ventilation holes 21 and 22, helping the heat dissipation element 50F's dissipating function.

The lamp base 10 contains an upper member 11 and a lower member 12 stacked and bolted together. On a top side of the upper member 11, a button 13 elastically supported by a spring 13 is provided that, once engaged, a switch 16 is toggled to either provide or withhold electricity to the power circuits 50D and 51D, which in turn either turn on or off the light emitting diodes 50C and 51C, respectively. Along the inner wall of the back cover 30, ditches 32 and 33 are provided so that conduction wires could be laid through to connect the power circuits 50D and 51D together.

Figure 4:
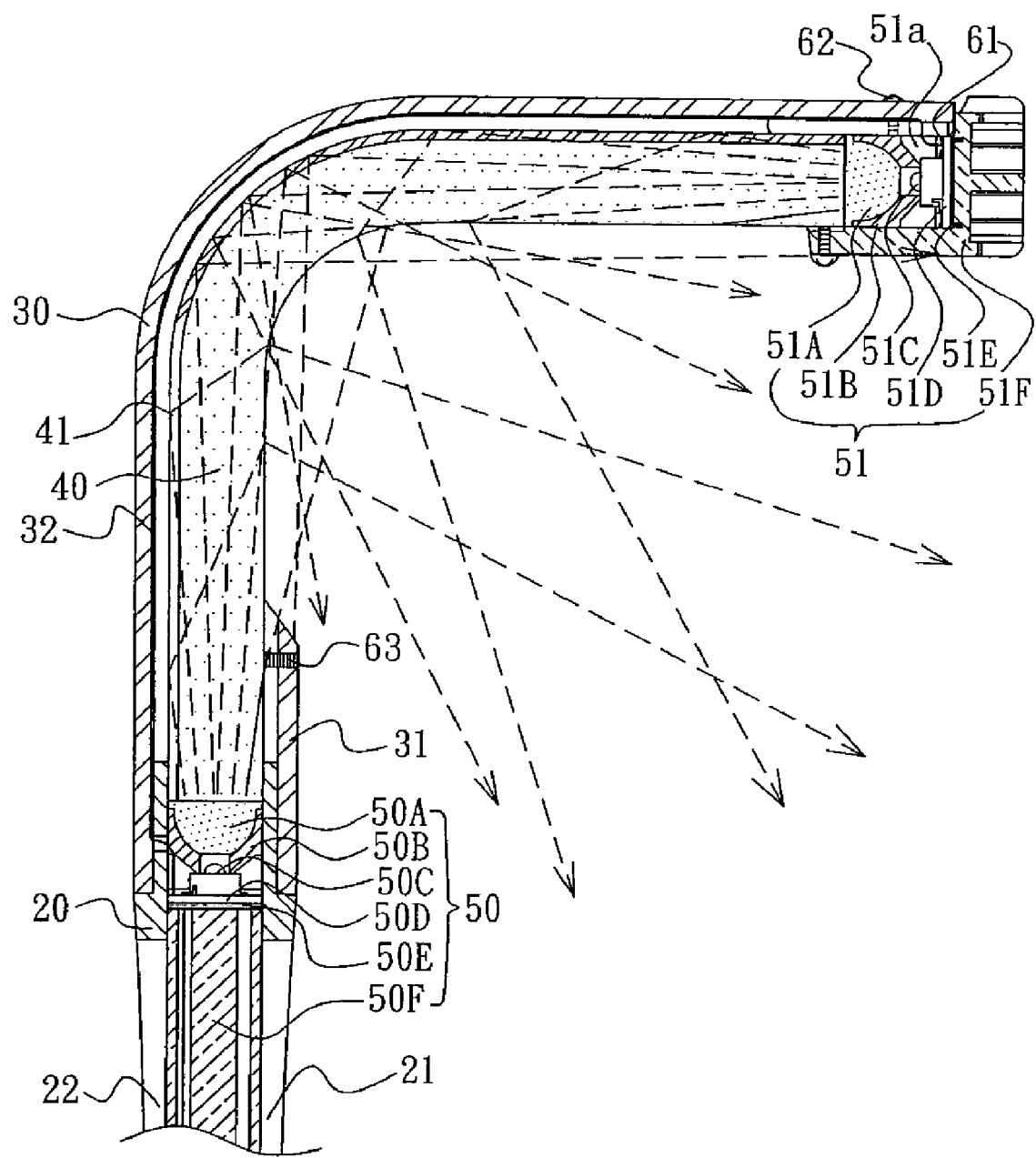
FIG. 4 is a sectional diagram showing the light trajectories within the table lamp of FIG. 1.

As shown in FIG. 4, when electricity is introduced into the power circuits 50D and 51D, the light emitting diodes 50C and 51C are turned on and light is projected into the light tube 40 from its both ends. The light beams from the both ends cross each other around the curved section of the light tube 40 and, due to the reflection layer 41, they are uniformly reflected towards the area beneath the light tube 40. The use of the light emitting diodes 50C and 51 has made the table lamp significantly energy-saving. Also, as the table lamp could be conveniently disassembled, the various parts could be easily recycled if required.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A table lamp, comprising:
   a lamp base;
   an extension tube plugged vertically into a top side of said lamp base;
   a curved transparent light tube and a curved back cover attached in parallel, said back cover having a tubular segment at a back end, said light tube being plugged into said tubular segment, the combination of said light tube and said tubular segment being joined to a top end of said extension tube; and
   a first light generation assembly bolted to said back end of said light tube and a second light generation assembly bolted to a front end of said light tube, each of said first and second light generation assemblies composed sequentially of a lens, a lens ring, a light emitting diode, a power circuit, a heat dissipation plate, a heat dissipation element, each lens having a light emitting end attached to an end of said light tube and a light incident end joined to the respective lens ring so as to be further joined to the respective light emitting diode, the light from said light emitting diodes thereby being projected into said light tubes.

2. The table lamp according to claim 1, wherein a portion of the inner wall of said light tube that is adjacent to said back cover is coated with a reflective material to form a reflection layer.

3. The table lamp according to claim 1, wherein said heat dissipation element of said first light generation assembly is significantly longer than said heat dissipation element of said second light generation assembly.

4. The table lamp according to claim 1, wherein said heat dissipation element of said second light generation assembly has a tubular body with a top portion removed to form an opening; said combination of said lens, lens ring, light emitting diode, power circuit, and heat dissipation plate are housed in said tubular body of said heat dissipation element; said light tube and said back cover have their front ends joined to said heat dissipation element of said second light generation assembly together; a bolt hole is provided on said heat dissipation element so that a bolt is run through to fix said light tube.

5. The table lamp according to claim 4, wherein said opening is covered by said front end of said back cover; and there are bolt holes on said back cover and said heat dissipation element, respectively, so that a bolt is run through to fix said back cover.

6. The table lamp according to claim 1, wherein said power circuits are attached to said heat dissipation plates, and then together to said heat dissipation elements, respectively; bolts are then applied to run through said power circuits, said heat dissipation plates, and into said first and second heat dissipation elements, respectively.

7. The table lamp according to claim 1, wherein said tubular segment has a bolt hole so that a bolt is run through to fix said back end of said light tube.

8. The table lamp according to claim 1, wherein bolt holes are provided on said back cover and said extension tube, respectively, so that a bolt is run through to fix said back cover and said extension tube together.

9. The table lamp according to claim 1, wherein at least a ventilation hole is provided along the wall of said extension tube.

10. The table lamp according to claim 1, wherein said lamp base contains an upper member and a lower member stacked and bolted together; on a top side of said upper member, a button elastically supported by a spring is provided that, once engaged, a switch is toggled to either provide or withhold electricity to said power circuits.

11. The table lamp according to claim 1, wherein, along the inner wall of said back cover, ditches are provided so that conduction wires are laid through to connect said power circuits together.

* * * * *